(12) United States Patent
Bluck et al.

(10) Patent No.: US 11,187,834 B2
(45) Date of Patent: Nov. 30, 2021

(54) MULTI-COLORED DIELECTRIC COATING

(71) Applicant: Intevac, Inc., Santa Clara, CA (US)

(72) Inventors: Terry Bluck, Santa Clara, CA (US);
Paul Ramon Markoff Johnson, Sunnyvale, CA (US); Alexander Vassilievich Demchuk, Sunnyvale, CA (US)

(73) Assignee: INTEVAC, INC., Santa Clara, CA (US)

( * ) Notice: Subject to any disclaimer, the term of this patent is extended or adjusted under 35 U.S.C. 154(b) by 118 days.

(21) Appl. No.: 16/281,013

(22) Filed: Feb. 20, 2019

(65) Prior Publication Data

US 2019/0383976 A1 Dec. 19, 2019

Related U.S. Application Data

(60) Provisional application No. 62/685,215, filed on Jun. 14, 2018.

(51) Int. Cl.
*G02B 5/08* (2006.01)
*H04M 1/02* (2006.01)

(52) U.S. Cl.
CPC ........ *G02B 5/0833* (2013.01); *H04M 1/0202* (2013.01)

(58) Field of Classification Search
CPC .......... G02B 5/08; G02B 5/0833; G02B 5/28; G02B 5/281; G02B 1/115; H01L 51/52; H01L 51/5271; H01L 27/32; H01L 27/3206; H01L 27/1464; H01L 27/14603; H01L 27/1463; C03C 17/42; C03C 17/34;
(Continued)

(56) References Cited

U.S. PATENT DOCUMENTS 4,099,838 A * 7/1978 Cook ................ G02B 5/128
359/537
9,079,802 B2 * 7/2015 Bellman ............ C04B 35/597
(Continued)

FOREIGN PATENT DOCUMENTS

| CN | 105353430 | 12/2017 | |
| CN | 105353430 B | 12/2017 | |
| JP | 10-078510 | * 3/1998 | ............... G02B 5/28 |

(Continued)

OTHER PUBLICATIONS

Transmittal of the International Search Report and Written Opinion of the International Searching Authority dated Oct. 9, 2019, for PCT/US2019/034223, filed May 28, 2019, 9 pages.

(Continued)

*Primary Examiner* — Jie Lei
(74) *Attorney, Agent, or Firm* — Womble Bond Dickinson (US) LLP; Joseph Bach, Esq.

(57) ABSTRACT

A multi-color dielectric coating is formed using interleaved layers of dielectric material, having alternating refractive index, to create reflections at selected wavelengths, thus appearing as different colors. Etching of selected layers at selected locations changes the color appearance of the etched locations, thus generating a coating having multiple colors. The thicknesses of the layers are chosen such that the path-length differences for reflections from different high-index layers are integer multiples of the wavelength for which the coating is designed.

11 Claims, 3 Drawing Sheets

(58) Field of Classification Search
CPC ............. C03C 17/3417; C03C 17/3411; C03C 17/3435; C03C 17/3441; H04M 1/0202
USPC ....... 359/838, 839, 850, 861, 359, 584, 586, 359/589
See application file for complete search history.

(56) References Cited

U.S. PATENT DOCUMENTS

2015/0194443 A1  7/2015  Chen et al.
2017/0315270 A1  11/2017  Yasuda et al.

FOREIGN PATENT DOCUMENTS

JP   2016170413 A   9/2016
TW    201435316 A   9/2014

OTHER PUBLICATIONS

Examination Opinions from the Taiwan Intellectual Property Office for Taiwanese Patent No. 108118710, dated May 21, 2020, 4 pages.
Transmittal of International Preliminary Report on Patentability dated Dec. 24, 2020, for PCT/US2019/034223, filed May 28, 2019, pp. 6.
Transmittal of the International Search Report and Written Opinion of the International Searching Authority dated Oct. 9, 2019, for PCT/US2019/034223, filed May 28, 2019, pp. 9.

* cited by examiner

MULTI-COLORED DIELECTRIC COATING

CROSS-REFERENCE TO RELATED APPLICATION

This application claims priority from U.S. Provisional Application No. 62/685,215, filed Jun. 14, 2018, the disclosure of which is incorporated herein by reference in its entirety.

BACKGROUND

1. Field

This disclosure relates generally to the field of optical and decorative coatings, such as multi-colored dielectric coating for electronic devices, and to the manufacturing of such optical coating.

2. Related Art

Mirrors are generally fabricated by applying metallic coating on one side of a transparent substrate, such as glass. The general function of the coating is to reflect light at the entire visible spectrum (i.e., white light). In some applications it is desired to reflect light, but to maintain the transparency of the glass. Since metallic coating is opaque, in such cases a dielectric coating, generally referred to as dielectric mirror or Bragg mirror, is utilized. The coating is generated by applying multiple interleaved layers of high and low refractive index dielectric materials. The reflections from the low-index layers have exactly half a wavelength in path length difference, but there is a 180-degree difference in phase shift at a low-to-high index boundary, compared to a high-to-low index boundary, which means that these reflections are also in phase. In the case of a mirror at normal incidence, each of the layers has a thickness of a quarter wavelength.

In general, dielectric mirrors have been used in panel glass to replace standard mirrors and enable more complex mirror applications. See, e.g., U.S. Publication 2015/0287957. Dielectric mirrors can be used to provide privacy when viewing from one direction, but enable see-through when viewing from the other direction, to enable transmission of images, such as a TV positioned behind the mirror, etc. See, e.g., U.S. Pat. No. 9,977,157. Since proper selection of the thickness and material of the layers can be tailored to reflect radiation at different wavelengths, it has also been suggested to use dielectric mirror as thermal barrier. See, e.g., U.S. Publication 2014/0083115. Finally, dielectric mirrors have also been suggested to be used to obscure elements from user's view. See, e.g., U.S. Pat. No. 9,727,178.

The trend in mobile devices, such as cellphones and tablets, is to decrease thickness while presenting a monolithic casing. Making the casing out of milled metal proved sometimes problematic, as it can interfere with wireless transmission and reception. Also, metallic casing prevents wireless charging of the device. Thus, a trend developed for making the casing out of glass, which is transparent to electromagnetic radiation. However, while glass may present a monolithic appearance, there's a need to provide an opaque appearance of glass to obscure the innards of the device.

SUMMARY

The following summary of the disclosure is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Disclosed embodiments enable colorful dielectric coating of glass, thereby presenting different colors to the user and obscuring the innards of the device. Disclosed aspects provide methods and systems for imparting multi-color dielectric coating onto glass, thereby presenting an attractive appearance to mobile devices, while being transparent to electromagnetic radiation.

In the disclosed embodiments the multi-color dielectric coating is formed using interleaved layers of dielectric material, having alternating refractive index, to create reflections at selected wavelengths, thus appearing as different colors. Etching of selected layers at selected locations changes the color appearance of the etched locations, thus generating a coating having multiple colors. The thicknesses of the layers are chosen such that the path-length differences for reflections from different high-index layers are integer multiples of the wavelength for which the coating is designed.

One aspect involves a method for forming a multi-color dielectric coating on a mobile device casing, the method comprising the steps of alternatingly depositing transparent dielectric coating layers of high refractive index and low refractive index, the thickness and number of the dielectric coating layers selected so as to reflect light at a selected wavelength thereby appearing as a first color; and etching a designed shape in at least one of the dielectric coating layers to thereby cause the dielectric coating layer to reflect light at a different wavelength within the designed shape, so as to appear as a different color. The etching may be performed in between the deposition of the dielectric coating layers, or after all of the dielectric coating layers have been deposited. The etching may be performed by holding the casing stationary in front of a mask, continuously transporting the casing in front of the mask to thereby generate a striped designed shape, or stepping the casing in front of the mask to thereby generate a repeated design shape. The etching may be performed by placing a mask on one side of an extraction grid and placing the casing on the opposite side of the extraction grid, such that the mask is between the plasma and the extraction grid.

According to one aspect, each layer is deposited to a thickness of a quarter of a wavelength of a first color. Then the deposited layer is etched to generate a desired design having a thickness of a quarter wavelength of a second color. Thus, all of the layers are first deposited to have a first thickness corresponding to a quarter of a wavelength of a first color, but each layer is partially etched to reduce its thickness to a second thickness at the location of the design or pattern, wherein the second thickness corresponds to a quarter wavelength of a second color.

In general aspects, a processing system for forming a multi-color coating on a substrate is provided, the system comprising: a deposition processing section having paired vapor transport deposition chambers comprising a first chamber configured to deposit a first refractive index dielectric coating and a second chamber configured to deposit a second refractive index dielectric coating, having lower refractive index than the first refractive index dielectric material; an etching section configured to perform etching of at least one of the layers formed by the deposition processing section; and a buffer section configured to enable different transport speeds between the deposition processing section and the etching section. The system may further include a parking station, configured to enable parking of substrate carriers in vacuum environment.

Disclosed embodiments include a method for forming a multi-color coating, comprising: providing a transparent substrate; forming a plurality of transparent layers over the substrate by alternatingly forming a first refractive index layer having a first refractive index and a second refractive index layer having a second refractive index, a plurality of times, the thickness and number of layers configured to generate a reflection of light appearing as a first color; transporting the substrate to an etch chamber and etching at least one of the transparent layers through a mask, the depth of the etching configured to generate a reflection of light appearing as a second color different from the first color. The thickness of each of the first refractive index layer and the second refractive index layer may be set to a quarter of the wavelength of the first or second color. Alternatively, the first and second refractive index layers are formed to have a thickness corresponding to a quarter wavelength of the first color, and the first and second refractive index layers are etched to have a thickness corresponding to a quarter wavelength of the second color.

BRIEF DESCRIPTION OF THE DRAWINGS

Other aspects and features of the invention would be apparent from the detailed description, which is made with reference to the following drawings. It should be appreciated that the detailed description and the drawings provides various non-limiting examples of various embodiments of the invention, which is defined by the appended claims.

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIG. 1 illustrates dielectric coating stack configured to reflect light at a selected wavelength, thus appearing as one selected color, while

DETAILED DESCRIPTION

Embodiments of the inventive multi-color dielectric coating and its processing will now be described with reference to the drawings. Different embodiments or their combinations may be used for different applications or to achieve different results or benefits. Depending on the outcome sought to be achieved, different features disclosed herein may be utilized partially or to their fullest, alone or in combination with other features, balancing advantages with requirements and constraints. Therefore, certain benefits will be highlighted with reference to different embodiments, but are not limited to the disclosed embodiments. That is, the features disclosed herein are not limited to the embodiment within which they are described, but may be "mixed and matched" with other features and incorporated in other embodiments.

Disclosed embodiments include systems and methods for forming multi-color coating using dielectric transparent layers. In the context of this disclosure, dielectric coating comprises an arrangement of interleaved dielectric layers of different refractive index, configured to reflect selected wavelength(s) of light. By properly selecting the refractive indexes and the thickness and number of the layers, the dielectric coating can be tailored to reflect white light, or only selected wavelengths so that the item appears to be colored. For example, when the layers are selected to constructively reflect at 600 nm wavelength, the item would appear yellow, while when the layers are configured to constructively reflect at 700 nm the item would appear red, although each of the layers is individually transparent. In the first example, each of the layers would be of thickness of, e.g., 150 nm (a quarter of 600 nm), while in the second example, each layer may be of thickness of 175 nm. Thus, in one example, each of the layers is first deposited to a thickness of 175 nm, and to generate a design at different color, each layer may be etched to a thickness of 150 nm at the design area, thereby providing a yellow design over a red background.

The high refractive index layers can be made of one or combinations of the following (stoichiometric and non-stoichiometric) optical films: NbOx, ZrO, Y—ZrO, AlN, SiN, ZrN, TiO, CrO, CrN, CrTiO, and CrTiN. The low refractive index layers can be made from one or combinations of the following films: SiOx, AlO, SiON, SiAlO. In this context, it should be appreciated that the terms low refractive index and high refractive index are not used as quantitative measurement, but rather as relative descriptors enabling distinction between the alternating layers. What is important in the dielectric coating context is not the specific values of the refractive index, but that the low refractive index layers have a refractive index value that is sufficiently lower than that of the high refractive index to bring about the required optical effect.

According to disclosed embodiments, the multi-color coating can be formed on a variety of crystalline or non-crystalline substrates, such as glass (including treated glass, such as Gorilla Glass®), sapphire, and plastic. The coating is especially beneficial for mobile device enclosures or casings. They provide attractive colored films on the casing without creating electrical/magnetic field (EMF) interference, which could degrade wireless transmission/reception and wireless charging functions required for today's mobile devices.

As can be understood, the thickness and uniformity of all of the layers forming the dielectric coating is critical to present the desired color. Thus, in disclosed embodiments the layers are formed in a vapor transport system which deposits the alternating layers of high and low refractive index material. To create the multi-color appearance, the coated substrate is transported into an etching chamber and the coating is partially etched to create design of two or more colors. The etching may be performed through a mask to create the desired design. The mask may be placed in contact or proximal to the substrate so as to generate a defined boundary between the two colors. Conversely, the mask may be placed at a distance from the substrate configured to generate a gradient or gradual boundary between the two colors. Further, the substrate may be stationary or in motion with respect to the mask, so as to generate different design effects.

Figure 1:
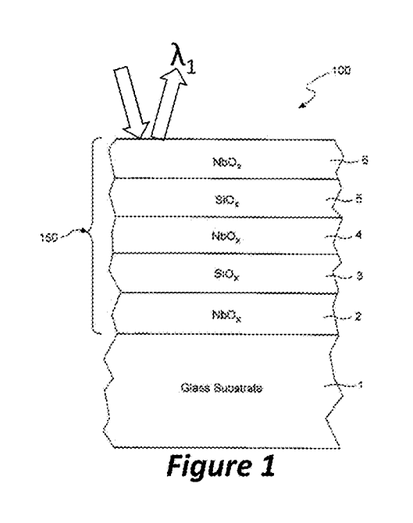

FIG. 1 illustrates a cross-section of a dielectric coating 100 according to one embodiment. Dielectric coating 150 is deposited over glass substrate 1 and comprises interleaving layers of high and low refractive index material. In FIG. 1, layers 2, 4 and 6 are made of high refractive index dielectric material, such as niobium oxide, while layers 3 and 5 are made of low refractive index silicon oxide, all of which individually are transparent layers. While in the prior art the number and thickness of these layers is configured to reflect white light—thus forming a dielectric mirror, in this embodiment the number and thickness of layers is configured to constructively reflect light only at a certain wavelength, $\lambda_1$, thus appearing as color coating.

Figure 1A:
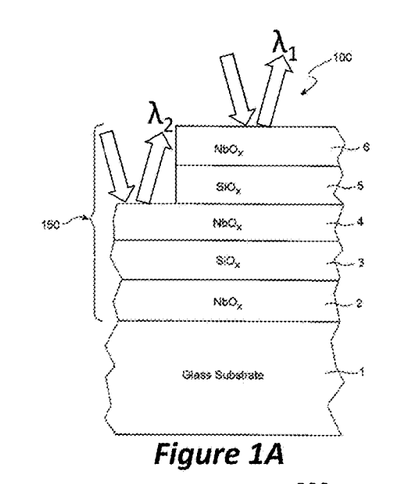
FIG. 1A illustrates an embodiment wherein part of the coating has been etched to generate a reflection at a second wavelength, thus providing a multi-color appearance.

FIG. 1A illustrates a cross section of a dielectric coating 100 according to another embodiment. In this embodiment, the dielectric coating 150 is first formed according to the embodiment of FIG. 1, thus reflecting light at a selected wavelength, $\lambda_1$, and appearing as color coating. Additionally, part of the dielectric coating 100 is etched to a designated depth, thus creating a section of the coating that reflects light at a different wavelength, $\lambda_2$, and appearing as a different color coating than the area reflecting light at wavelength $\lambda_1$. Consequently, a multi-color dielectric coating is created. The etch process can be repeated several times to different depths over different areas, thereby creating more colors.

Figure 2:
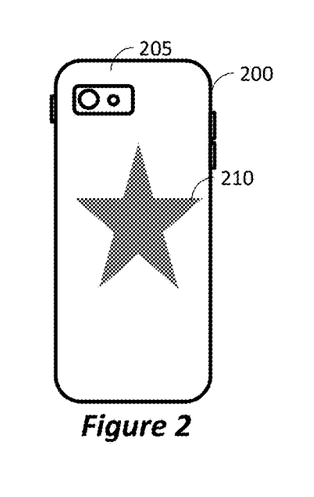
FIG. 2 illustrates a mobile device casing having dielectric coating with an etched design, thus appearing as a two-color coating.
Figure 2A:
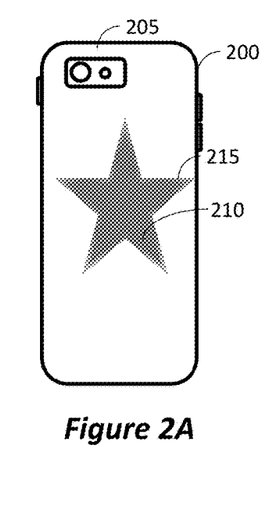
FIG. 2A illustrates the same coating as in FIG. 2, except that during etching the casing has been positioned at a distance from the etch mask, thus generating a fading or transition boundary between the background and the etched design.

FIG. 2 illustrates an example of a pattern design on a back surface of a cellphone. In this example, the back of the cellphone is made of glass 200, to enable transmission/reception of antennas inside the cellphone and to enable wireless charging. A dielectric coating is formed over the entire surface of the glass so as to generate a background color 205, and then part of the coating is etched using a mask so as to generate a pattern color 210. In the embodiment of FIG. 2, the transition between the background color 205 and the pattern color 210 is sharp. This is done by placing the etching mask with the pattern in close proximity or in physical contact with the glass 200. In this context, the term "close proximity" means that the distance between the mask and the substrate is insufficient to allow the etchant species to sufficiently spread so as to cause visible blurring of the boundary of the etch design. On the other hand, in FIG. 2A the mask is placed at a distance from the glass 200, such that there's sufficient travel distance for the etch species to spread naturally, thereby blurring the boundary between the background color 205 and the pattern color 210, thus generating a transition boundary 215.

Thus, in one aspect a mobile device encasing is provided, comprising: a rear panel made of dielectric material transparent to electromagnetic radiation; a plurality of dielectric layers provided over the rear panel, the plurality of dielectric layers being made up of an interlaced series of dielectric layers having a first refractive index and dielectric layers having a second refractive index, higher than the first refractive index; wherein a first part of the rear panel has n number of the plurality of dielectric layers designed to reflect light at a first wavelength, and a second part of the rear panel has m number of the plurality of dielectric layers designed to reflect light at a second wavelength.

In another aspect, a mobile device encasing is provided, comprising: a rear panel made of dielectric material transparent to electromagnetic radiation; a plurality of dielectric layers provided over the rear panel, the plurality of dielectric layers being made up of an interlaced series of dielectric layers having a first refractive index and dielectric layers having a second refractive index, higher than the first refractive index; wherein a first part of the rear panel has each of the plurality of dielectric layers having thickness of a quarter of a first wavelength, and a second part of the rear panel has each of the plurality of dielectric layers having thickness of a quarter of a second wavelength.

Various methods and systems for achieving the multi-color dielectric coatings will now be described.

Figure 3:
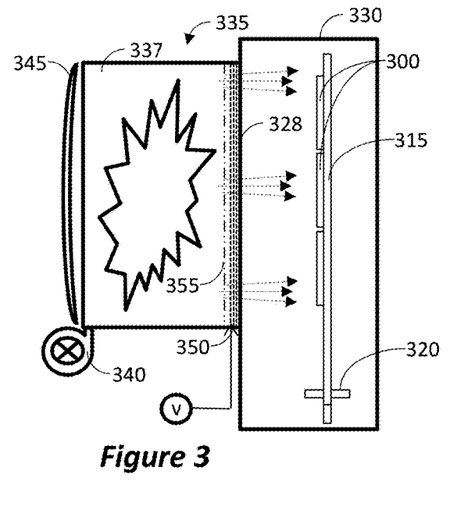
FIG. 3 illustrates a cross-section of an etch chamber according to one embodiment, wherein the mask is positioned on one side of the extraction grid and the substrate is positioned on opposite side of the extraction grid, thus the mask is positioned between the plasma and the extraction grid.

FIG. 3 is a cross-section illustrating an etch chamber 335 according to one embodiment. The etch chamber 335 is attached to a sidewall of a transport chamber 330, and provide etchant species through a window 328 between the etch chamber 335 and the transport chamber 330. The substrates 300 are mounted onto substrate carriers 315 and are transported in the transport chamber 330, which is maintained in vacuum condition. The substrates 300 are exposed to etchants when they face the window 328. The etch chamber 335 is evacuated by vacuum pump 340 and maintains plasma therein by, e.g., RF antenna 345. The etchant species are extracted from the plasma by extraction grids 350, and are directed towards the substrates 300. As the etchant species emerge from the grids 350, they naturally disperse at a slight angle, e.g., 3%, as shown by the dotted-line arrows.

In order to generate a pattern on the substrates, a mask needs to block part of the etchant species from reaching the substrate in areas where no etching is desired. In general, when using masks in the prior art, sometimes referred to as shadow masks, the mask is positioned on the substrate to be etched. However, such an arrangement causes the mask itself to also continuously be etched. This is undesirable, especially since particles etched from the mask can fall on the substrate and will be easily visibly detectable to a user. Therefore, in the embodiment of FIG. 3, the mask 355 is inserted inside the etch chamber, between the plasma and the extraction grids 350. In this manner, the mask 355 limits the areas from which the extraction grids can extract etchant species, thereby generating a pattern. Stated another way, while in the prior art the masks limits the etchants that impinge on the substrate, in the embodiment of FIG. 3 the mask limits the spatial extraction of etchant species from the plasma.

Figure 3A:
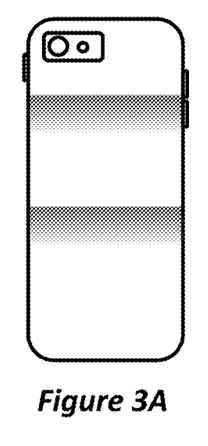
FIGS. 3A and 3B illustrate mobile device casings that have been coated with a dielectric coating and then etched to generate a designed shape, FIG. 3A illustrating a stripe shaped generated by continuously moving the casing in front of the mask, while FIG. 3B illustrating a repeated shape generated when stepping the casing in front of the mask while etching.
Figure 3B:
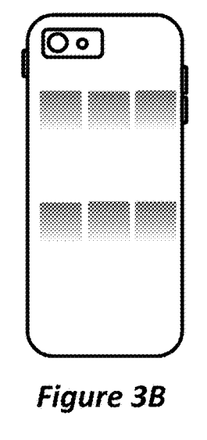

In the embodiment of FIG. 3, different patterns can be generated by controlling the transport of substrates carrier 315. For example, to generate a pattern corresponding to that illustrated in FIG. 2A, the carrier is transported (e.g., by wheels 320) to a position in front of the window 328 and then held stationary as the pattern is etched into the dielectric coating. Conversely, in order to generate the stripes shown in FIG. 3A, the carrier is moved continuously in front of the window 328 while the etch process is carried out. The pattern shown in FIG. 3B is generated by stepping of the carrier, i.e., moving the carrier a step and then holding the carrier in place while etch is performed, then moving the carrier another step and stopping for etch process, etc., as many times as needed to obtained the desired pattern.

In the embodiment of FIG. 3, potential from power source v is applied to the extraction grids 350. Thus, in order to stop the etch process, rather than extinguishing the plasma, the potential to the extraction grid is stopped, but plasma is maintained in the plasma compartment 337. Therefore, when the carrier is moved between steps, the potential to the grid is stopped as well.

As shown in FIG. 1, the dielectric coating comprises a plurality of high and low refractive index layers. However, the deposition sources for the high and low refractive index materials are rather expensive. Therefore, while it seems that the coating should be formed by moving the substrate in front of as many sources as the required layers; such an arrangement is not economical. Moreover, such an arrangement is not flexible in that it does not land itself well to changes in patterns that may be required. Accordingly, the following embodiments illustrate flexible architectures that can form the coating using a paired sources: a single high refractive index source and a single low refractive index source. These architectures are also very flexible and enable the operator to change pattern design and colors of the coating, without having to change the hardware.

Thus, in one aspect, a method for fabricating a rear panel for a mobile device is provided, comprising: obtaining a plate made of dielectric material transparent to electromagnetic radiation; placing the plate inside a deposition system and operating the deposition system to deposit over the plate a plurality of n number of dielectric layers, the plurality of dielectric layers being made up of an interlaced series of dielectric layers having a first refractive index and dielectric layers having a second refractive index, higher than the first refractive index, wherein the n number of the plurality of dielectric layers is designed to reflect light at a first wavelength; and transporting the plate into an etch chamber and etching a section of the plate so that only m number of the plurality of dielectric layers remain in the section, the m number of dielectric layers designed to reflect light at a second wavelength.

Also, a method for fabricating a rear panel for a mobile device is provided, comprising: obtaining a plate made of dielectric material transparent to electromagnetic radiation; placing the plate inside a deposition system and operating the deposition system to deposit over the plate a plurality of dielectric layers, the plurality of dielectric layers being made up of an interlaced series of dielectric layers having a first refractive index and dielectric layers having a second refractive index, higher than the first refractive index, wherein each of the plurality of dielectric layers has a thickness designed to reflect light at a first wavelength; and transporting the plate into an etch chamber and etching a section of the plate so that at the section each the plurality of dielectric layers has thickness designed to reflect light at a second wavelength.

For either method, the etching step may be performed by applying potential source to an extraction grid so as to extract etchant species from a plasma and accelerate the etchant species towards the plate. A mask may be inserted between the plasma and the extraction grid.

Figure 4:
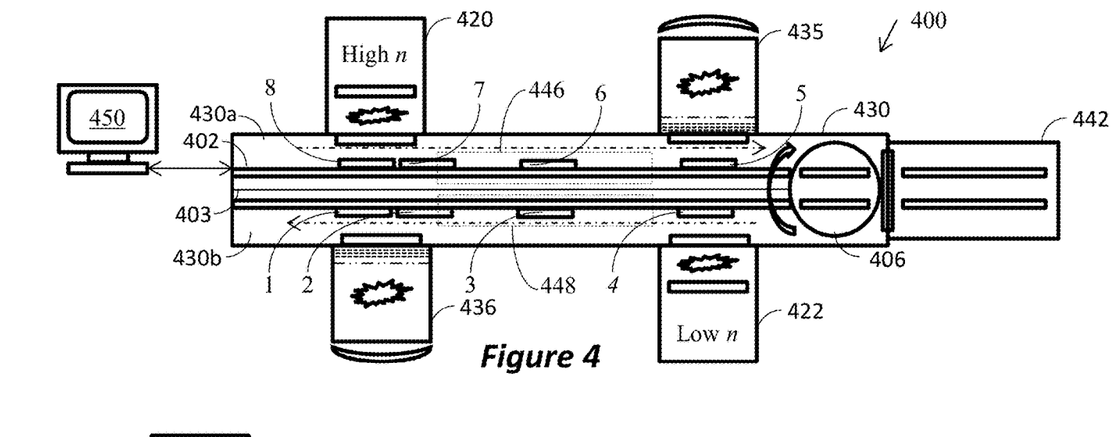
FIG. 4 illustrates an embodiment of a system for generating a multi-color dielectric coating on substrates.

FIG. 4 illustrates an embodiment of system architecture that enables depositing dielectric coating with etching to generate multi-color appearance. For illustration purposes, the system 400 is illustrated with eight carriers being processed; the carriers enumerated 1-8 in the order in which they entered the system, each carrier capable of supporting a plurality of substrates. The carriers travel on tracks 402 and can be transported individually, each at a designated speed. The speeds at which each carrier is transported changes depending on its location in the process, as will be described below.

The system 400 includes a transport chamber 430, which is divided into two parts 430a and 430b, by partition 403. The carriers travel in one direction in one part, and in the opposite direction in the second part, as shown by line-dot arrows. A turntable 406 transport carriers between the two parts of the transport chamber 430. In the moment illustrated in FIG. 4, carriers 1, 2, 3, and 4 have completed processing in part 430a and are being processed in part 430b, while carriers 5, 6, 7, and 8 are being processed in part 430b. When this process is completed, carriers 1, 2, 3, and 4 may be removed from the system and carriers 5, 6, 7, and 8 moved into part 430b. Conversely, carriers 1, 2, 3, and 4 can be moved back to part 430a to form an additional high refractive index layer, while carriers 5, 6, 7, and 8 may be moved to part 430b to form the low refractive index layer. Such an exchange may be performed using the exchanger chamber 442.

Attached to the transport chamber 430 is a pair of deposition chambers 420 and 422; chamber 420 including a target of high refractive index material and chamber 422 having a target of low refractive index material. Also attached to the transport chamber 430 is at least one etch chamber; FIG. 4 illustrating two etch chambers. In the embodiment of FIG. 4 the illustrated sequence of carrier travel is to high n deposition chamber 420, then to etch 435, then to low n deposition chamber 422 and then to etch 436; however, the location of chambers 422 and 436 can be swapped, such that the order is high n deposition 420, then etch 435, then second etch 436 and then low n 422. Such a switched arrangement is beneficial especially when the etch process takes more time than the deposition process. In such an arrangement, part of the etch can be done in chamber 435 and then the rest of the etch done in chamber 436, or one carrier can be etch-processed in chamber 435 while another carrier is etch-processed in chamber 436.

In the architecture of the system 400 of FIG. 4, the deposition process is performed in a pass-by mode, i.e., the carrier is in continuous motion in front of the deposition chambers 420 and 422. However, depending on the design sought to be etched on the substrates, the etch process may be performed in a static mode (carrier stationary during etch), in a pass-by mode, or in a step mode. The operator can select the mode using the controller 450. However, since the carriers cannot be stopped when deposition process is performed, buffer areas 446 and 448 (see broken-line rectangles) is provided between the deposition and etch chambers. In the buffer areas 446 and 448 each carrier can be sped, slow down, or stopped in idle individually, until the next chamber is ready to accept the carrier.

For example, when carriers 1, 2, 3, and 4 have been loaded into the system, they first traverse the high n deposition chamber 420 to deposit a first layer in a pass-by mode. As soon as carrier 1 finishes the deposition of the first layer, it is accelerated in the buffer area 446 to enter the etch chamber 435 and start the etch process. When carrier 2 finishes deposition of the first layer, if carrier 1 is still in etch processing, then carrier 2 is placed in idle in buffer area 446, until carrier 1 exits etch process in chamber 435, at which point carrier 2 can be accelerated and placed in position for etch processing. In this manner the transport speed of each carrier can be controlled independently to enable static, pass-by and step-wise processing of the substrates, as selected by the user in controller 450.

Moreover, once carriers 1-4 complete processing of a high n and a low n layers, if the operator selects to deposit another high n layer, carriers 1-4 can be transported into exchange chamber 442. Then, carriers 5-8 are moved by turntable 406 onto part 430b, and then carriers 1-4 can be moved back into part 430a. This exchange process can be performed multiple times to thereby form as many high n and low n layers as needed. Also, the exchange can be performed several times while skipping the etching process until a number of layers has been formed, and only then the carrier can enter the etching process. Thus, as can be seen, the system 400 provide flexibility in the number of layers formed, i.e., the background color, and the type of etch that can be performed, i.e., providing different design shapes and colors. All this flexibility can be controlled by the controller 450 without the need to change any hardware and using only one pair of deposition chambers and at least one etcher.

Figure 5:
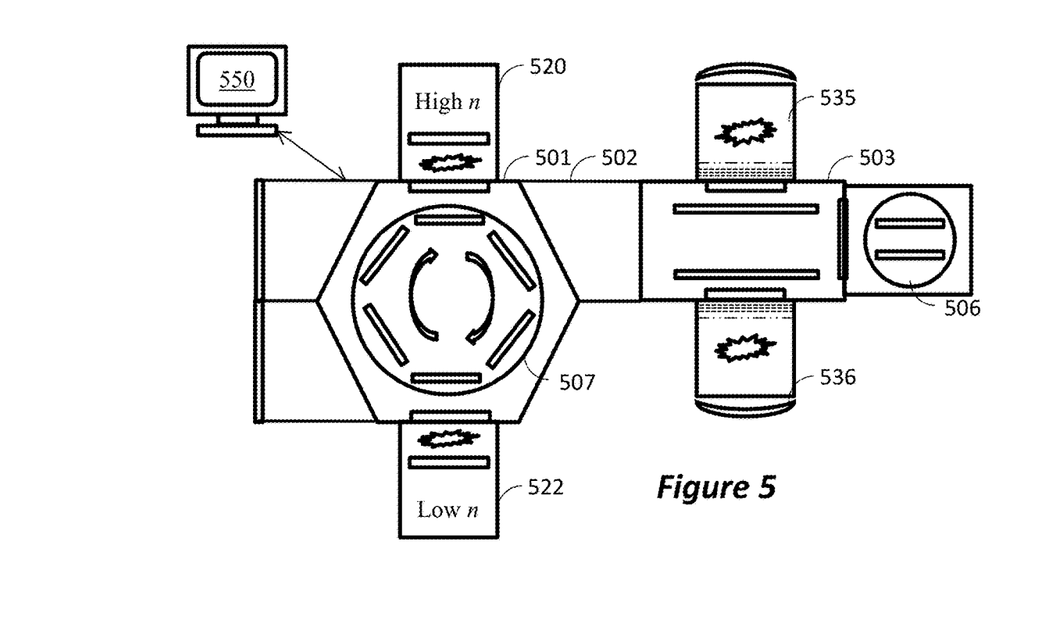
FIG. 5 illustrates another embodiment of a system for forming the optical coatings.

Another embodiment is depicted in FIG. 5, which is a hybrid architecture using a combination of rotating transport section and linear transport section. One advantageous feature of this embodiment is that it enables different designs at the operator level by allowing the operator to decide how many times to pass by the deposition and/or etch stations. In this embodiment, the longer a substrate remains in the rotating transport section, the higher the number of layers that are formed on the substrate, thus changing the color appearance of the substrate.

FIG. 5 illustrates another embodiment that enables programmable deposition and etching processes as required to achieve different colors and different designs. In the embodiment of FIG. 5, a rotating transport deposition section 501 is linked to a linear transport etch section 503, via buffer section 502. Deposition section 501 has a carousel 507 upon which carriers are mounted, and which rotates, as illustrated by the arrow. Two deposition sources 520 and 522 are attached to the deposition section 501, in an opposing orientation. Thus, when one carrier faces deposition chamber 520, another carrier faces the other deposition chamber 522. As the carousel rotates, substrates are continuously exposed to the deposition chambers and are deposited with alternating dielectric layers of different refractive index. So long as a substrate remains within the chamber 501, the number of deposited layers is increased.

When the substrates on a carrier are required to be etched, the carrier is moved into buffer chamber 502, and thence to etch chamber 503. Etch chamber 503 is a linear processing chamber, meaning the carriers are transported on a linear track, as opposed to deposition chamber wherein the carriers are rotated on a rotational carousel. Thus, in the system of FIG. 5 the carriers undergo both a rotational transport and a linear transport. Rotational transport is beneficial for deposition, as the substrate must continuously move in front of the deposition source to ensure uniform deposition over the substrates. Conversely, in order to enable flexibility to etch either in static mode, pass-by mode, or step-wise mode, it is beneficial to have a linear transport. Thus, this mixed transport modes of FIG. 5 is superior to prior art system utilizing only one transport mode.

Optionally, turntable 506 is provided at the end of the linear transport chamber 503, so as to enable exchanging substrates between etchers 522 and 535. Alternatively, or in addition, an exchange chamber similar to chamber 442 of FIG. 4 can be added, to function the same as in the embodiment of FIG. 4. Using the controller 550, the operator can program how many turns a substrate undergoes on the carousel before it is transferred to the linear chamber 503 for etching.

Thus, in one aspect, a system for fabricating a multi-color rear panel for a mobile device is provided, comprising: a vacuum sealable transport enclosure having transport mechanism configured for transporting glass plates; a first sputtering chamber mounted onto the sealable transport enclosure and having a sputtering target made of a first dielectric material having a first refractive index; a second sputtering chamber mounted onto the sealable transport enclosure and having a sputtering target made of a second dielectric material having a second refractive index; and an etch chamber mounted onto the sealable transport enclosure and having a plasma compartment and an extraction grid assembly configured to extract etch specimen from the plasma and accelerate the etch specimen through a window formed in the sealable transport enclosure.

Incidentally, the carousel 507 is shown to have a generally circular shape and rotating in a generally circular motion. However, the carousel and rotation may also be in an oval, elongated oval, oblong, etc., such that the terminology carousel and rotation are intended to cover such construction. Such an example is provided in FIG. 6.

Figure 6:
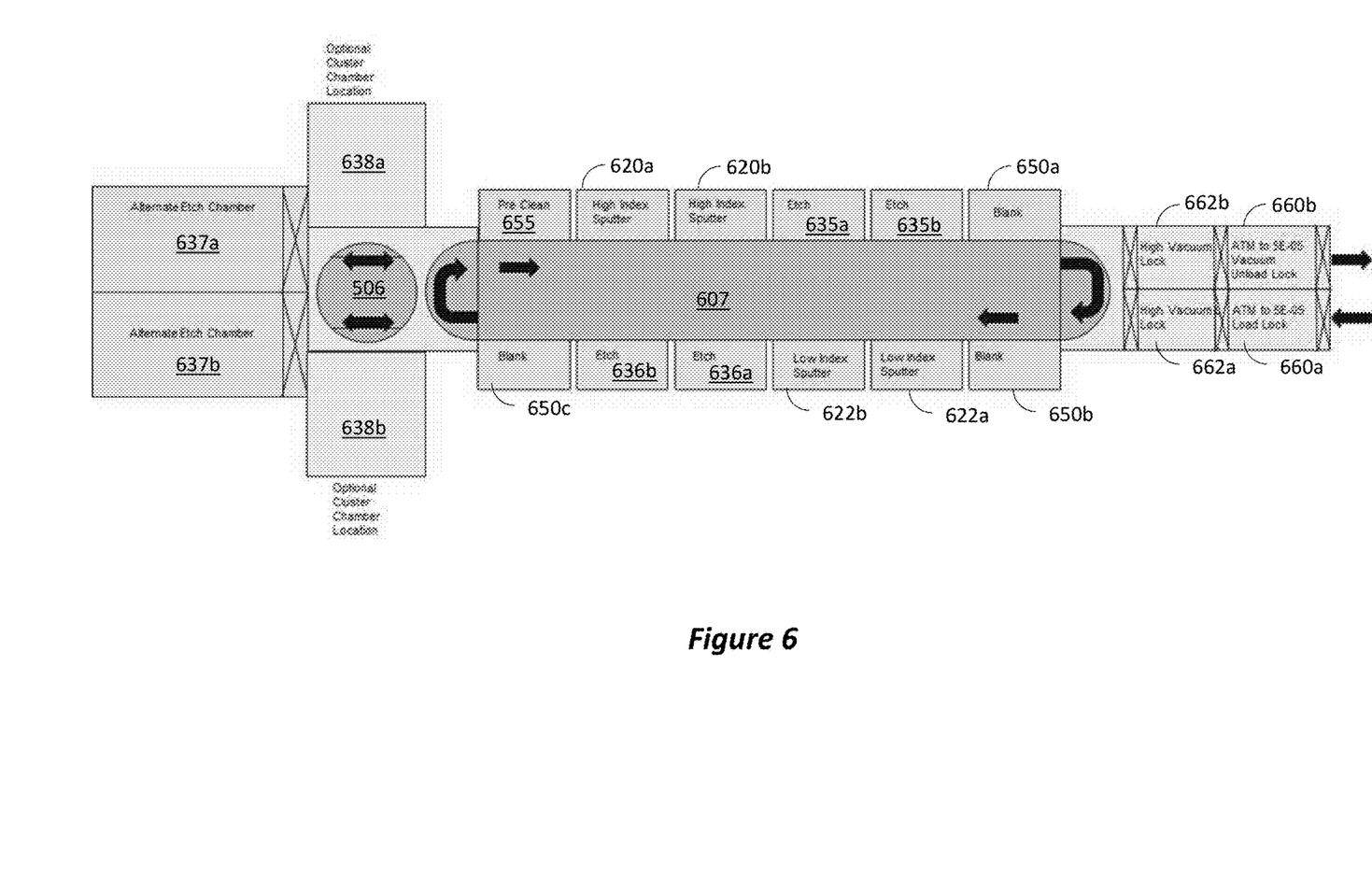
FIG. 6 illustrates an embodiment utilizing an oblong carousel.

FIG. 6 illustrates an embodiment utilizing an oblong carousel, also sometimes referred to as racetrack. The embodiment of FIG. 6 is particularly useful when each deposition step is followed by an etch step. The number of deposition and etch chambers may be changed according to the process flow. In this particular example, two high index sputtering chambers, 620a and 620b, are position serially, one immediately following another. Similarly, two low index sputtering chambers, 622a and 622b, are position serially, one immediately following another. Two etch chambers, 635a and 635b, follow immediately after the high index sputtering chamber 620b. Similarly, two etch chambers, 636a and 636b, follow immediately after the low index sputtering chamber 622b. This embodiment also includes three blank chambers, 650a-650c, which may be used as buffer chambers to synchronize the processes in all of the chambers, or as empty slots to add deposition and/or etch chambers if and when the process changes, e.g., to create different or more colors. Furthermore, a pre-clean chamber 655 is provided, to clean the substrates prior to starting deposition of the high index material. All of the described chambers are arranged around the carousel 607, which transfers substrates or substrate carriers among the chambers, in a racetrack fashion.

In the example of FIG. 6, the substrates enter and exit the system from the same side, which makes it simpler for factory automation. The substrates enter the system's vacuum environment through loadlock 660a, and from there proceed to high vacuum lock 662a. From the high vacuum lock the substrates or substrate carriers are loaded onto the carousel 607. Conversely, to remove the substrates from the system's vacuum environment, the substrates or substrate carriers are offloaded from the carousel 607 and enter the high vacuum lock 662b. From there the substrates are moved to the loadlock 660b, and then exit the system. The loadlocks and lock chambers are isolated by gate valves.

Optionally, in order to make the system more modular, turntable 506 is added and is configured to transfer substrate carriers into optional alternate etch chamber 637a and/or 637b, and/or to optional cluster chamber 638a and/or 638b. cluster chamber 638a and/or 638b may be, e.g., a metrology tool to measure, e.g., the thickness of the deposited layers.

In disclosed embodiments the dielectric layers are made of metal oxides, nitrides or oxynitrides. Some examples include: YsZ, $Al_xO_y$, AlN, $Si_xN_y$, AlSiO, and SiON. In some embodiment, the various layers are formed using ion beam assisted deposition (MAD), such that the target material is made of the metal to be deposited and the oxygen or nitrogen are ion implanted during deposition. Thus, the sputtering process is performed in metal mode (also referred to as Metamode) wherein the target is sputtered as a (non-oxidized) metal, typically by Argon ions, and the very thin film that is formed on the substrate (~1 nm typically) is converted into an oxide or nitride by hitting the deposited metal with $O_2$ or $N_2$ ion beam. For example, the target for the sputtering may be made of pure silicon or aluminum, while the ion beam includes $O_2$ or $N_2$, with or without argon, to form layers of SiO, SiN, AlO, etc. Also, in preferred embodiments the ratio of ion current to atom arrival rate is less than 0.5, and the ions have potential energy no higher than 600 eV.

In some embodiments, the refractive index of any layer can be changed by alloying the material. For example, MgO can be used to alloy a high refractive index material such as ZrOx or a low index material such as AlOx. The alloying can be done by adding about 8-10% of MgO, which will lower the crystallization temperature of the layer. In another example, about 10-12% of chromium can be alloyed with titanium to improve toughness. Anatase, one of the three mineral forms of titanium dioxide, has a high refractive index of 2.4, but has low hardness, and is therefore a good candidate for alloying. Titanium itself can be used as alloying agent to change refractive index. Tantalum can be alloying agent to change properties of high refractive index material, while Boron can be alloying agent to change the properties of a low refractive index material.

It should be understood that processes and techniques described herein are not inherently related to any particular apparatus and may be implemented by any suitable combination of components. Further, various types of general purpose devices may be used in accordance with the teachings described herein. The present invention has been described in relation to particular examples, which are intended in all respects to be illustrative rather than restrictive. Those skilled in the art will appreciate that many different combinations will be suitable for practicing the present invention.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

The invention claimed is:

1. A mobile device encasing comprising:
   a rear panel made of a dielectric material transparent to electromagnetic radiation;
   a plurality of dielectric layers provided over the rear panel forming an opaque panel obscuring the innards of the mobile device, the plurality of dielectric layers being made up of a plurality of first dielectric layers having a first refractive index n1 and a plurality of second dielectric layers having a second refractive index n2, higher than the first refractive index, wherein the plurality of first dielectric layers are interlaced with the plurality of second dielectric layers;
   wherein a first part of the rear panel has n number of the plurality of dielectric layers designed to reflect light at a first wavelength, and a second part of the rear panel has m number of the plurality of dielectric layers designed to reflect light at a second wavelength, and wherein n does not equal to m.

2. The mobile device encasing of claim 1, wherein each of the plurality of dielectric layers is individually transparent over entire optical range of wavelengths.

3. The mobile device encasing of claim 1, wherein the thicknesses of the plurality of dielectric layers are chosen such that resulting path-length differences for reflections from different second refractive index layers are integer multiples of the first or second wavelengths.

4. The mobile device encasing of claim 1, where a boundary between the first and second part is abrupt, such that only the first and second wavelengths are reflected at the boundary.

5. The mobile device encasing of claim 1, where a boundary between the first and second part is transitioned, such that wavelengths in addition to the first and second wavelengths are reflected at the boundary.

6. The mobile device encasing of claim 1, wherein each of the plurality of dielectric layers has a thickness of a quarter of the first wavelength.

7. The mobile device encasing of claim 1, wherein each of the plurality of dielectric layers has a thickness of a quarter of the first wavelength and a partial area having a thickness of a quarter wavelength of the second wavelength.

8. The mobile device encasing of claim 1, wherein each of the plurality of first dielectric layers comprises one or combinations of the following materials: NbOx, ZrO, Y—ZrO, AlN, SiN, ZrN, TiO, CrO, CrN, CrTiO, and CrTiN.

9. The mobile device encasing of claim 8, wherein each of the plurality of second dielectric layers comprises one or combinations of the following materials: SiOx, AlO, SiON, SiAlO.

10. The mobile device encasing of claim 1, wherein each of the plurality of first dielectric layers comprises one or combinations of the following materials: AlN and SiN, and wherein each of the plurality of second dielectric layers comprises one or combinations of the following materials: SiOx, AlO, SiON, SiAlO.

11. The mobile device encasing of claim 1, wherein the rear panel is made of treated glass.

* * * * *